United States Patent
Wang

[19]

[11] Patent Number: 5,960,815
[45] Date of Patent: Oct. 5, 1999

[54] AIR NOZZLE OF INFLATING DEVICE

[76] Inventor: Lopin Wang, 17F, No. 696, Sec. 4, Wen-Hsin Road, Taichung, Taiwan

[21] Appl. No.: 08/903,444

[22] Filed: Jul. 30, 1997

[51] Int. Cl.$^6$ .................................................. F16K 15/20
[52] U.S. Cl. ..................... 137/118.03; 137/231; 137/223; 137/119.06
[58] Field of Search .................................... 137/223, 231, 137/118.03, 119.06

[56] References Cited

U.S. PATENT DOCUMENTS

| | | | |
|---|---|---|---|
| 2,141,033 | 12/1938 | Crowley | 137/231 |
| 2,992,652 | 7/1961 | Fellberg | 137/118.03 |
| 3,048,860 | 8/1962 | Richardson | 137/223 |
| 4,823,831 | 4/1989 | Jaw | 137/223 |
| 4,932,849 | 6/1990 | Scheffer | 137/223 |
| 5,645,100 | 7/1997 | Chuang et al. | 137/223 |
| 5,666,990 | 9/1997 | Wu | 137/223 |
| 5,749,392 | 5/1998 | Glotin | 137/231 |

*Primary Examiner*—John Rivell
*Assistant Examiner*—Meredith H. Schoenfeld
*Attorney, Agent, or Firm*—Browdy and Neimark

[57] ABSTRACT

An inflating device is provided with an air nozzle having two connectors of different specifications and engageable with inflation valves of different specifications. The air nozzle is composed of a shell, a distribution valve chamber located in the shell, an obstructing body located in the distribution valve chamber, and two connectors in communication with the distribution valve chamber. When one of the two connectors is engaged with the inflation valve of an object to be inflated, another one of the two connectors is idled such that air is prevented from entering the idled connector by the obstructing body. As the connector at work is disengaged with the inflation valve of the object, the obstructing body is capable of returning to its original position in the distribution valve chamber which is devoid of air.

8 Claims, 3 Drawing Sheets

AIR NOZZLE OF INFLATING DEVICE

FIELD OF THE INVENTION

The present invention relates generally to an inflating device, and more particularly to an air nozzle of the inflating device.

BACKGROUND OF THE INVENTION

The conventional air pump is generally provided with one air nozzle which is engageable with a specific inflation valve of the object to be inflated. The inflatable objects are generally provided with inflation valves which must meet different specifications, such as the U.S. specification, the French specification, etc. In other words, a number of inflating devices having air nozzles of different specifications are needed for inflating the objects having inflation valves of different specifications. This is a rather expensive and inefficient way of doing the job of inflating the inflatable objects.

SUMMARY OF THE INVENTION

The primary objective of the present invention is therefore to provide the inflating device with an air nozzle having two connectors of different specifications for engaging the inflation valves of different specifications. As one of the two connectors is at work, another one of the two connectors is automatically idled without further involement of opertor.

In keeping with the principle of the present invention, the foregoing objectives of the present invention are attained by the air nozzle consisting of a shell which is provided with two connectors of different specifications. The connectors have an air hole in communication with a distribution valve chamber located in the head shell such that the distribution valve chamber is in communication with an air discharging duct of the inflating device. The distribution valve chamber is provided therein with a super-flow obstructing member capable of being attracted by the air current to obstruct the air hole of the connector which is not being used. At the onset of pumping the air, most of the air entering the head shell is let out via the idled connector such that the obstructing member is attracted by the attraction force of the fast-moving air current to block the air hole of the idled connector so as to allow the upcoming air to pass the air hole of the connector in use. Upon completion of the inflating process, the distribution valve chamber is devoid of air current so that the obstructing member is capable of returning to its initial position to be ready for another round of air pumping action.

The foregoing objectives, features, functions, and advantages of the present invention will be more readily understood upon a thoughtful deliberation of the following detailed description of the embodiments of the present invention with reference to the accompanying drawings.

DETAILED DESCRIPTION OF THE INVENTION

Figure 1:
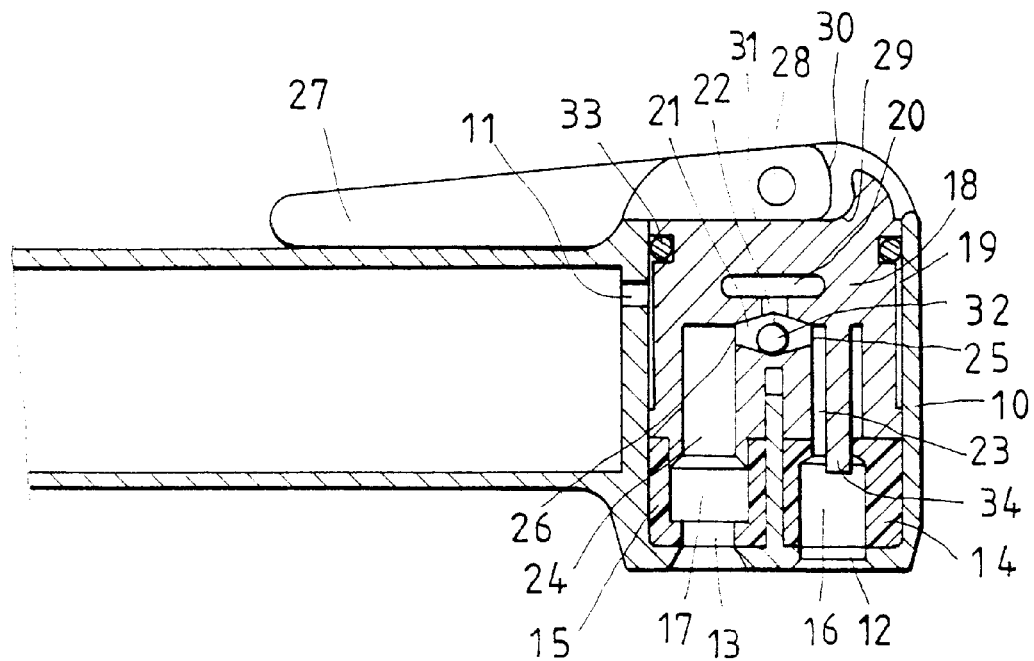
FIG. 1 shows a sectional view of a first preferred embodiment of the present invention.
Figure 6:
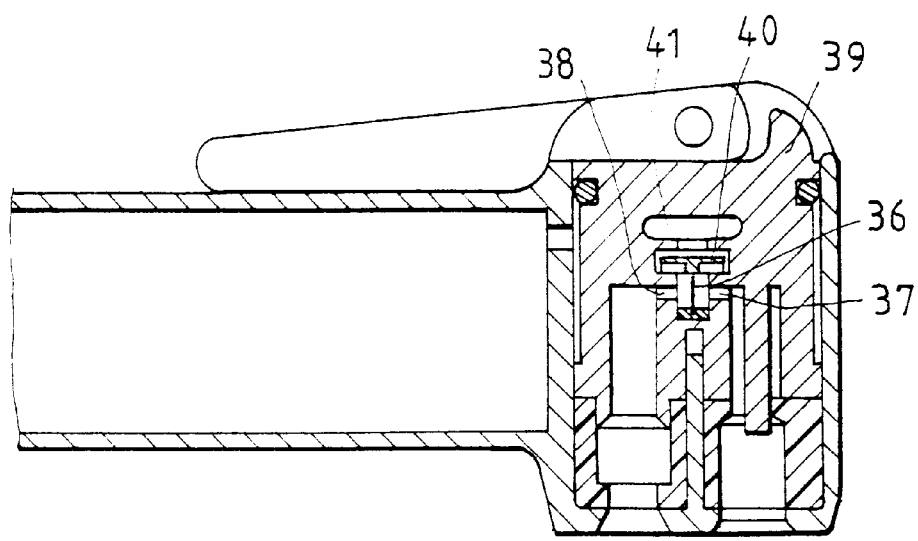
FIG. 6 shows a sectional view of a second preferred embodiment of the present invention.

As shown in FIG. 1, an air nozzle embodied in the present invention is intended for use in a hand pump and is composed of the component parts, which are described explicitly hereinafter.

A head shell 10 has an air admitting hole 11 in communication with an air discharging duct of the hand pump. The head shell 10 is in fact an integral part of the cylinder of the hand pump; nevertheless the head shell 10 may be connected with the inflating device (the hand pump) by means of a tube. The head shell 10 is provided in the bottom thereof with a large hole 12 and a small hole 13.

Two connectors 14 and 15 are made of a rubber material and are provided respectively with a through hole 16 or 17. The connectors 14 and 15 are located in the head shell 10 such that the through holes 16 and 17 are in communication with the large hole 12 and the small hole 13 respectively.

A main body 18 is located in the head shell 10 such that the outer wall of the main body 18 and the inner wall of the head shell 10 are provided therebetween with an interstice 19. The main body 18 is provided with a through hole 20 and a distribution valve chamber 21 in communication with the through hole 20 via a passage 22. The valve chamber 21 is provided with two ducts 23 and 24 via which the valve chamber 21 is in communication with the through holes 16 and 17 of the two connectors 14 and 15. The ducts 23 and 24 are provided respectively with an air hole 25 or 26 of a tapered construction.

A press member 27 is fastened pivotally with the shell 10 by a pivot 28 such that the press member 27 is located on a top 29 of the main body 18, and that the distance between the right end surface 30 and the center of the pivot 28 is greater than the distance between the lower end surface 31 and the center of the pivot 28.

A super-flow obstructing member 32 is a spherical body made of a rubber or plastic material and is located in the distribution valve chamber 21.

A leakproof ring 33 is located at the upper portion of the main body 18.

Figure 4:
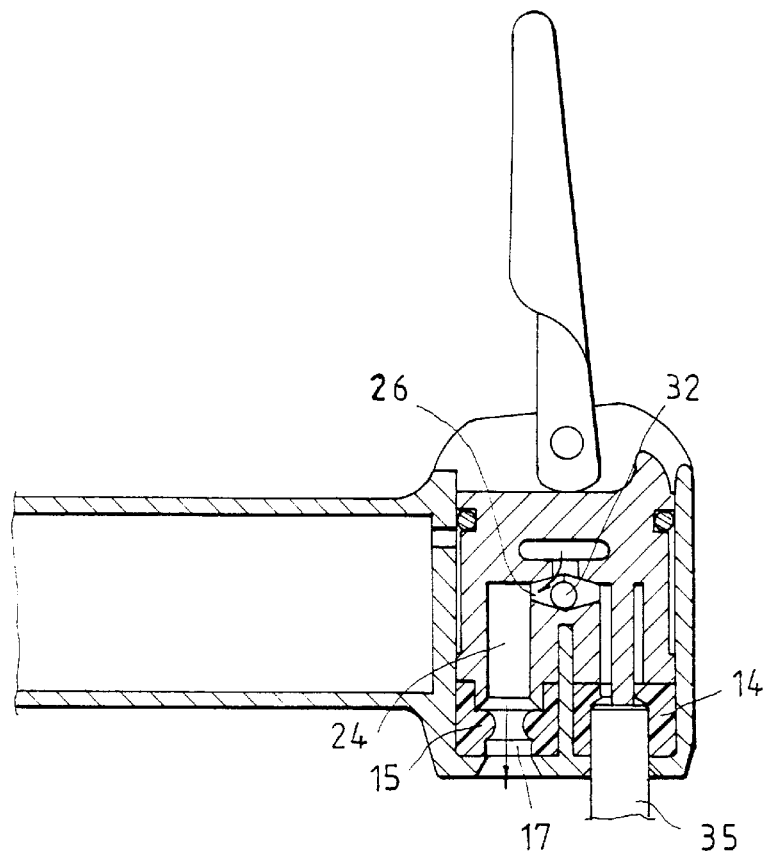

The main body 18 is provided with a pillar 34 corresponding in location to the large hole 12 for pressing a check valve (not shown in the drawings) of an inflation valve 35 of the tire, as shown in FIG. 4.

Figure 2:
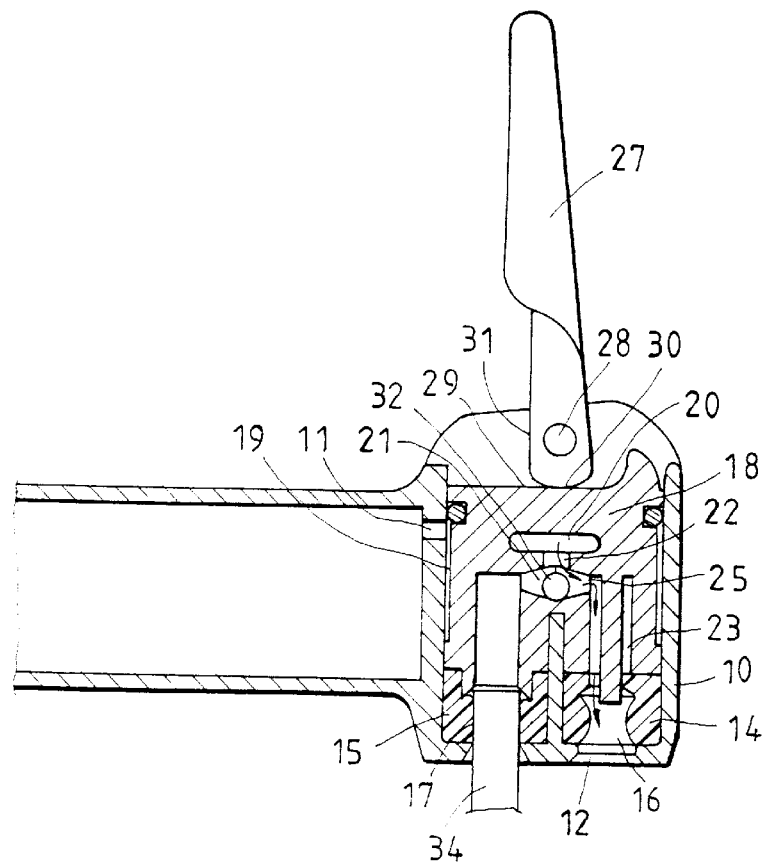
FIGS. 2–5 show schematic views of the first preferred embodiment of the present invention at work.

As shown in FIG. 2, the connector 15 is engaged with an inflation valve 34 of the tire, whereas the connector 14 is idled. As the press member 27 is lifted such that the end surface 30 of the press member 27 presses against the top 29 of the main body 18 so as to cause the main body 18 to displace downwards, in view of the fact that the distance between the end surface 30 and the pivot 28 is greater than the distance between the end surface 31 and the pivot 28. The two rubber connectors 14 and 15 are thus deformed such that the connector 15 is engaged securely with the inflation valve 34 of the tire to be inflated, and that the connectors 14 and 15 are associated with the head shell 10 in an airtight manner, and farther that the obstructing member 32 is located at the lowest level in the valve chamber 21.

Figure 3:
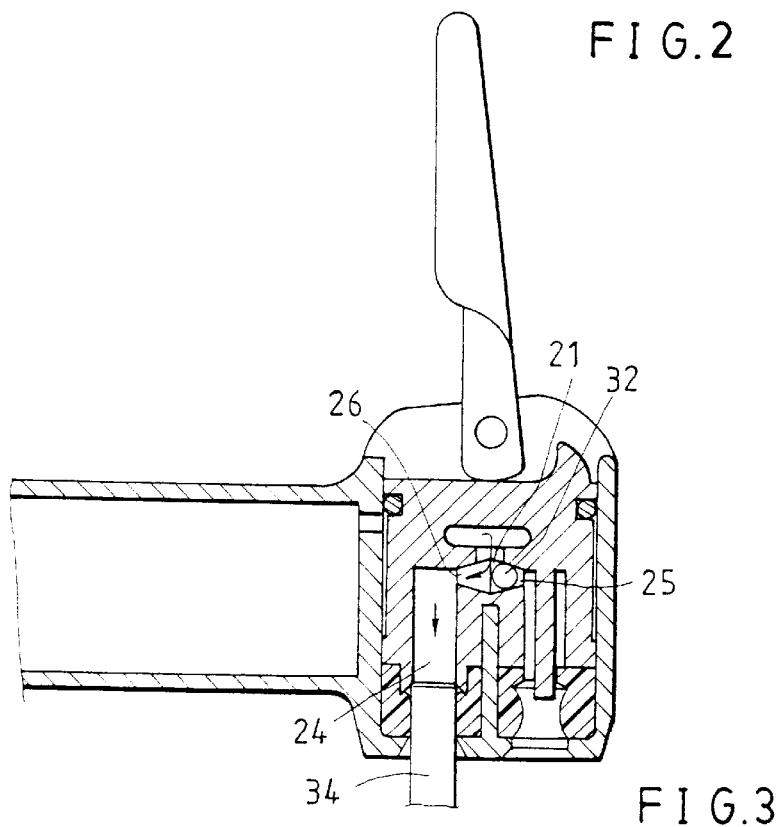

The mechanism by which the present invention works is illustrated in FIGS. 2–5. As the hand pump is at work, the atmospheric air is drawn into the interstice 19 via the air admitting hole 11 before flowing into the distribution valve chamber 21 via the through hole 20 and the passage 22. As the connector 14 is idled, the air is initially discharged via the air hole 25 of the connector 14, the duct 23, and the through hole 16 at the onset of the pumping action of the hand pump, as indicated by the arrows in FIG. 2. Such initial flow of air brings about an air current attraction capable of drawing the obstructing member 32 (a spherical body) towards the air hole 25, which is then blocked by the spherical body 32, as shown in FIG. 3. The air is thus pumped into the inflation valve 34 of a tire via the air hole 26 of the connector 15 at work, the duct 24, as indicated by the arrows in FIG. 3.

When the inflation valve 34 of the tire is disengaged with the connector 15, the spherical body 32 (obstructing member) is capable of returning to its original position in view of the absence of air in the valve chamber 21.

Figure 5:
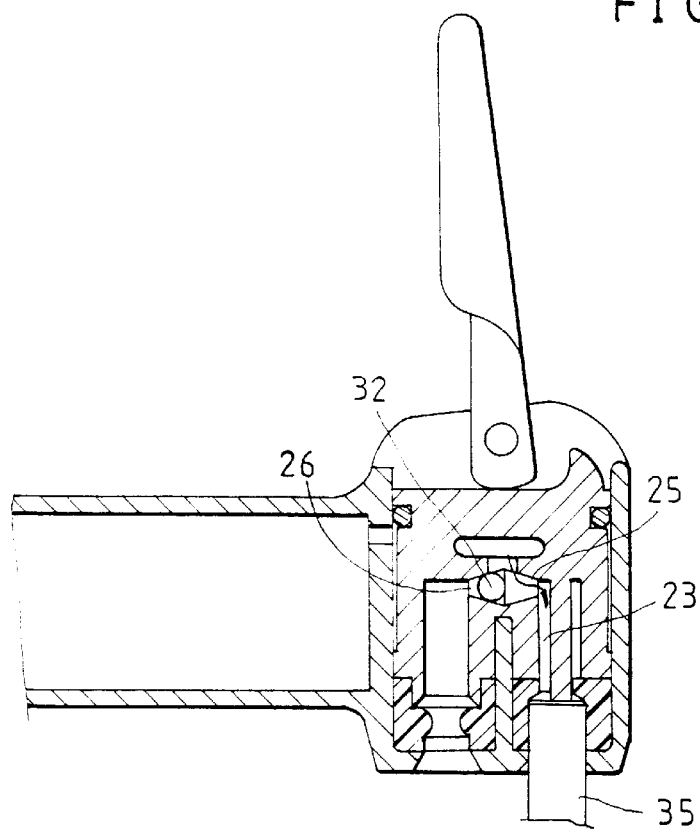

Similarly, when the connector 14 is at work, the air hole 26 of the idled connector 15 is blocked by the spherical body 32, as shown in FIG. 5. At the onset of the pumping action of the hand pump, the air is first discharged via the air hole 26 of the idled connector 15, the duct 24, and the through hole 17, as indicated by the arrows in FIG. 4. The initial air current brings about an air current attraction force capable of drawing the spherical body 32 to move towards the air hole 26, which is then blocked by the spherical body 32, as shown in FIG. 5. The air is thus pumped into the inflation valve 35 of a tire via the air hole 25 of the connector 14 at work, the duct 23 and the through hole 16, as indicated by the arrows in FIG. 5.

As shown in FIG, 6, the present invention is modified such that an obstructing member 36 of an elastic membrane is used to replace the spherical body 32 of the first preferred embodiment described above. The membrane 36 is capable of being drawn by the air current attraction force to block the air hole 37 or 38, which is not tapered in shape. In addition, the main body 39 is provided with a check valve 40 for preventing the back flow of air from the tire at such time when the inflation valve of the tire is disengaged with the present invention. Similarly, the first preferred embodiment of the present invention is also provided with a check valve which is not shown in the drawings. The check valve is a prior art structure and is not a subject matter of the present invention.

The embodiments of the present invention described above are to be deemed in all respects as being merely illustrative and not restrictive. Accordingly, the present invention may by embodied in other specific forms without deviating from the spirit thereof. The present invention is therefore to be limited only by the scopes of the following appended claims.

What is claimed is:

1. An air nozzle of an inflating device for inflating an inflatable object, said air nozzle comprising:

a shell having an air inlet hole in communication with an air discharging hole of an inflating device;

a distribution valve chamber located in said shell such that said distribution valve chamber is in communication with said air inlet hole of said shell;

each of two connectors engaged in said shell being in communication with said distribution valve chamber via a duct and an air outlet hole;

air hole obstructing body means movably located in said distribution valve chamber for automatically without operator assistance, blocking the air outlet hole of one connector of said two connectors when another connector of said two connectors is engaged to the inflatable object and the inflating device is actuated; and wherein each air outlet hole is open and said obstructing body means is in a neutral position when neither of said two connectors is in communication with the inflating device;

wherein said shell is provided therein with a displaceable main body; and wherein said distribution valve chamber is located in said main body such that said distribution valve chamber is in communication with said air inlet hole of said shell and said two connectors.

2. The air nozzle as defined in claim 1, wherein said shell is provided with two holes; wherein said two connectors are made of a resilient material and are located in said shell such that said two connectors are respectively in communication with said two holes of said shell.

3. The air nozzle as defined in claim 1, wherein said shell is provided with a press member which is fastened pivotally therewith and is provided with two end surfaces one of said two end surfaces making contact with said main body when said press member is rotated to cause said main body to displace and force said two connectors to deform.

4. The air nozzle as defined in claim 3, wherein said press member is mounted pivotally on a pivot such that said two end surfaces of said press member area different distance from a center of said pivot.

5. The air nozzle as defined in claim 1, wherein said obstructing body means is spherical is shape;

wherein said distribution valve chamber is provided with two tapered air outlet holes in communication with said ducts of said two connectors; and wherein said spherical obstructing body is capable of displacing to block either one of said two tapered air outlet holes of said distribution valve chamber.

6. The air nozzle as defined in claim 1, wherein said obstructing body is a membrane made of an elastic material.

7. The air nozzle as defined in claim 1, wherein said main body is provided with a leakproof ring fastened between said main body and said shell.

8. The air nozzle as defined in claim 7, wherein said main body is provided with a through hole located under said leakproof ring such that said through hole is in communication with said distribution valve chamber via a passage; and wherein said main body and said shell are provided therebetween with an interstice corresponding in location to said through hole such that said interstice is in communication with said air inlet hole of said shell.

\* \* \* \* \*